Figure 1:
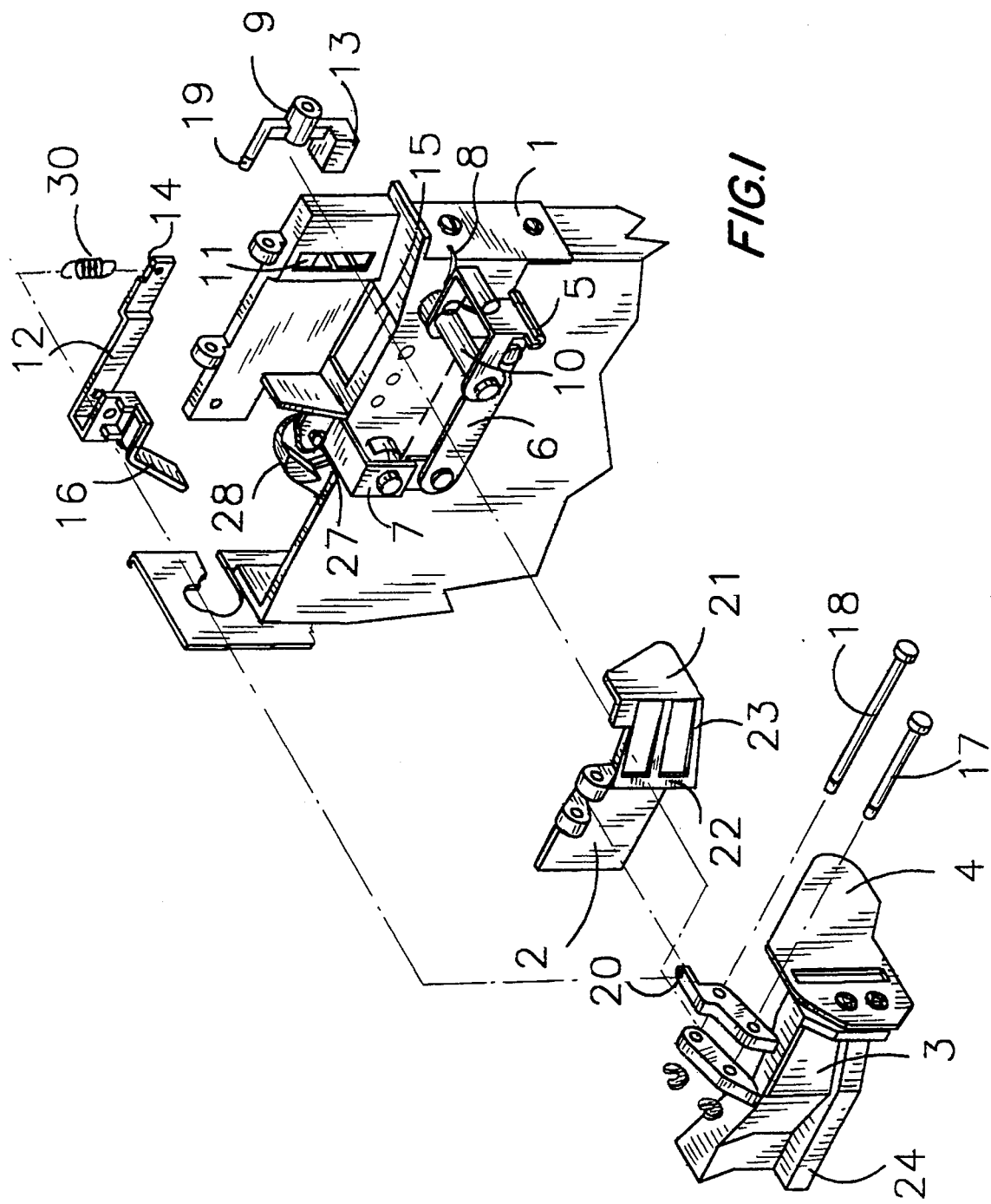

United States Patent [19]

Hsu

[11] Patent Number: 5,596,630
[45] Date of Patent: Jan. 21, 1997

[54] ANTI-STUFFING LEAD-IN-CHUTE ON COIN ACCEPTOR FOR PAYPHONE

[76] Inventor: Chen-yun Hsu, 141-03 15th Ave., Whitestone, N.Y. 11357

[21] Appl. No.: 178,028

[22] Filed: Jan. 6, 1994

[51] Int. Cl.⁶ .......................... H04M 17/00; G07F 1/04
[52] U.S. Cl. ............................................ 379/145; 194/345
[58] Field of Search ................................. 379/143, 145, 379/428, 437; 194/345

[56] References Cited

U.S. PATENT DOCUMENTS 5,299,673  4/1994  Wu ............................................. 194/345

Primary Examiner—Stephen Chin
Assistant Examiner—Kevin Kim

[57] ABSTRACT

An anti-stuffing lead-in-chute device for coin acceptor on a payphone, having an assembly of a multi-angled lead-in-chute which communicates at its top gripping point with a draw bar on a lever. Said lever, in response to manual operation of the coin return release, pulls down said gripping point on top of said lead-in-chute assembly so that an outside plate opens up from its bottom. In the meantime, an arm, sitting between two panels, pushes center plate which in turn kicks out stuffing when a conventional plate on coin mechanism pops out in response to manual operation of coin return release. Also in response to manual operation of the coin return release, a thin spring hook rotates up and around an axis to facilitate clearance of stuffing near the coin slot. The entire assembly returns to its normal working position after releasing stuffed tissue, cloth or similar material.

10 Claims, 14 Drawing Sheets

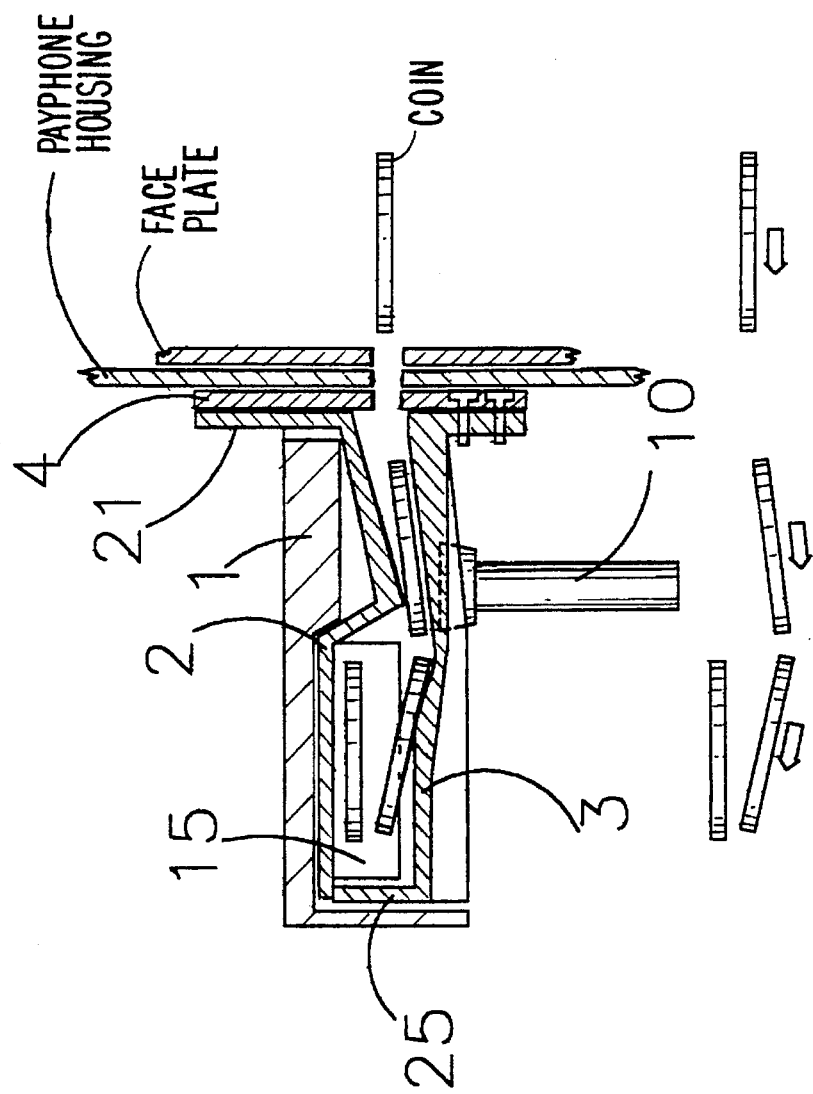

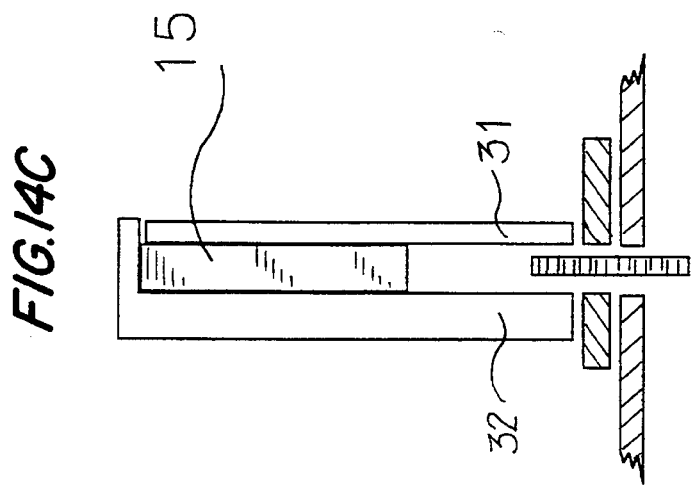
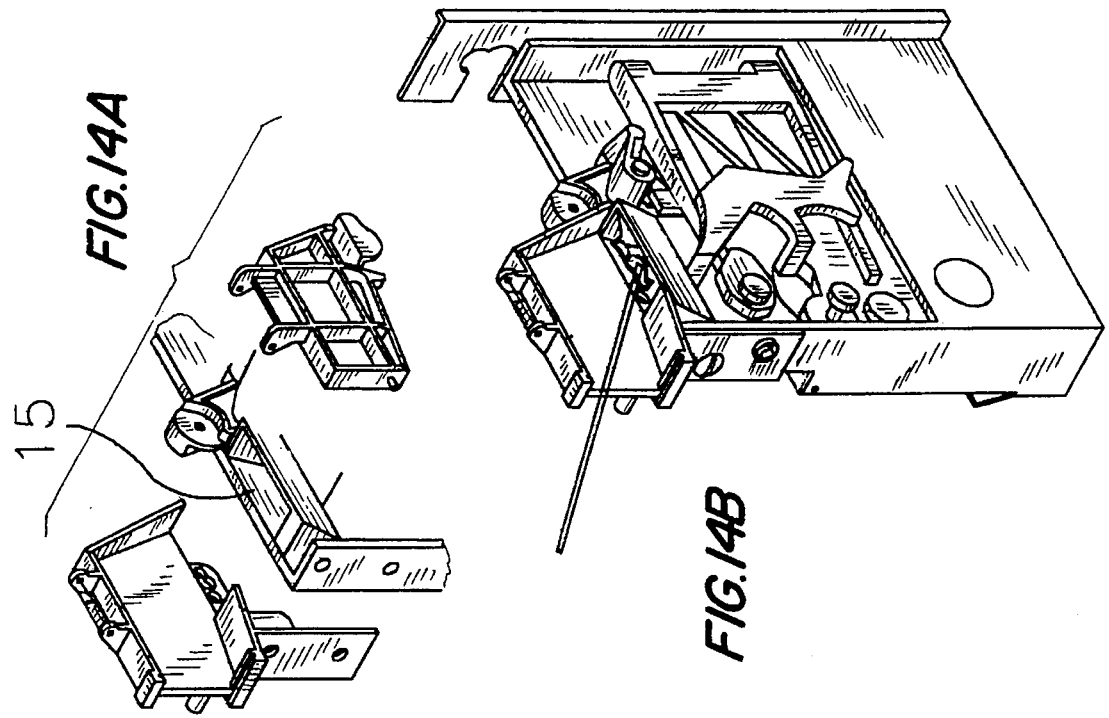

ANTI-STUFFING LEAD-IN-CHUTE ON COIN ACCEPTOR FOR PAYPHONE

BACKGROUND—Field of Invention

This invention relates to coin acceptor for coin-operated payphone, specifically to an anti-stuffing lead-in-chute device on coin acceptor.

BACKGROUND—Description of Prior Art

There are two major types of coin acceptors in market today: mechanical and electronic. Mechanical coin acceptors are more commonly used since they are economical and reliable. Most mechanical coin acceptors for GTE style payphones are currently supplied by CoinCo. of St Louis, Mo.

The GTE style payphones use coin acceptors manufactured by CoinCo. FIGS. 12 through 14C show the conventional coin acceptor for GTE style payphones. The coin acceptor has, among other things, a lead-in-chute on the top, which is formed by two upright rigid plates and goes straight from the coin slot to the entrance of coin mechanism. When coin is deposited through the coin slot, it rolls between plate 31 and plate 32 and goes directly into entrance 15, dropping into the coin mechanism (FIG. 14C).

Unscrupulous individuals have frequently taken advantage of this simple feature of lead-in-chute on coin acceptor by obstructing entrance 15. To obstruct entrance 15, the individual normally stuffs in tissue, cloth or similar material and then uses a wire or similar instrument to push the same into entrance 15 of coin mechanism (FIG. 14B).

When this is done, the coins deposited subsequently are caught behind the stuffing and can not be retrieved by operating the coin return release. A few hours later, the individual who has obstructed the coin mechanism entrance uses the wire or similar instrument, pushes the jammed coins and force them down to the coin mechanism. The coins drop down to the coin return through the coin mechanism and the individual pockets the coins.

What frequently happens also is that the stuffed tissue, cloth or similar material will get caught in the lead-in-chute or blocks the entire coin mechanism so renders it inoperable. While the thief may not have the chance to pocket the coins that are caught behind the stuffed material, innocent customers will continue to deposit coins into the coin acceptor while seeing no phone call go through and no coins returned. All the coin acceptors manufactured for GTE style payphones heretofore known suffer from a number of disadvantages:

(a) The lead-in-chute is a straight smooth channel which can be stuffed easily with tissue, cloth or similar material.

(b) The lead-in-chute consists of two rigid plates which are non-moveable and, thus, any jammed tissue, cloth or similar material will never be cleared without attention of a telephone technician.

(c) The coin slot and the coin mechanism entrance are in straight line so that a wire or similar instrument may reach the coin mechanism without any obstruction.

(d) Stuffed tissue, cloth or similar material can be pushed into the coin mechanism entrance easily with the help of a wire or similar instrument.

So far no successful design has been created to overcome these outlined problems.

OBJECTS AND ADVANTAGES:

Accordingly, several objects and advantages of the present invention are:

(a) To provide a multi-angled lead-in-chute which makes it impossible for one to stuff in tissue, cloth or similar material directly into the entrance of the coin mechanism;

(b) To provide an assembly comprising a multi-angled moveable center plate and a multi-angled moveable outside plate in conjunction with one non-moveable plate, which will be able to release tissue, cloth or similar material stuffed between the two moveable plates;

(c) To provide two small indentations on a bevel angled side of the center plate so that a wire or similar instrument will be stopped in either one of these indentations when penetrating through the coin slot;

(d) To provide a notch at the bottom of the moveable outside plate so that in case a wire or similar instrument penetrates through the coin slot, it will get caught in the notch, preventing it from going further and damaging the circuit board behind the lead-in-chute;

(e) To provide a thin spring hook which, in response to manual operation of the coin return release, will go up and around an axis bringing down from inside the lead-in-chute stuffing caught near the coin slot;

(f) To provide an arm which, in response to the movement of a conventional pop-out plate on the coin mechanism, will reaches in from its tip pushing the center plate which in turn kicks away stuffing from the lead-in-chute;

(g) To provide a linkage, a rolling tongue, and a lever which, when the coin return release is activated, will interact with each other and the lever will draw the outside plate to open from its bottom while center plate kicks out stuffing as described in (f) above.

Further objects and advantages of my invention will become apparent from a consideration of the drawings and ensuing description.

DRAWING FIGURES:

In the drawings, closely related parts have same letter but different numerical suffixes.

FIG. 1: Overall view of the lead-in-chute.

Figure 2:
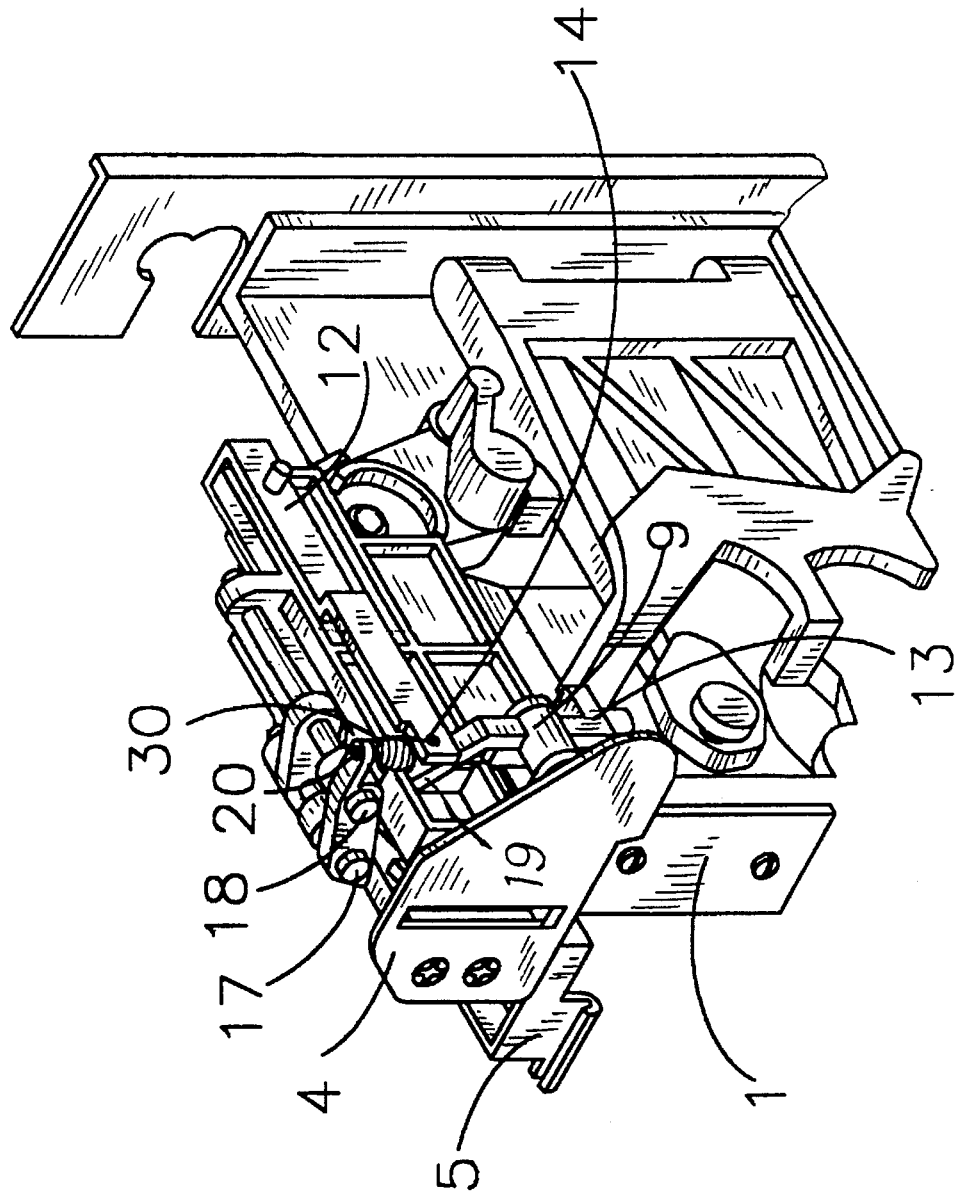

FIG. 2: Right side view showing top assembly of lead-in-chute, gripping point, lever, and arm.

Figure 3:
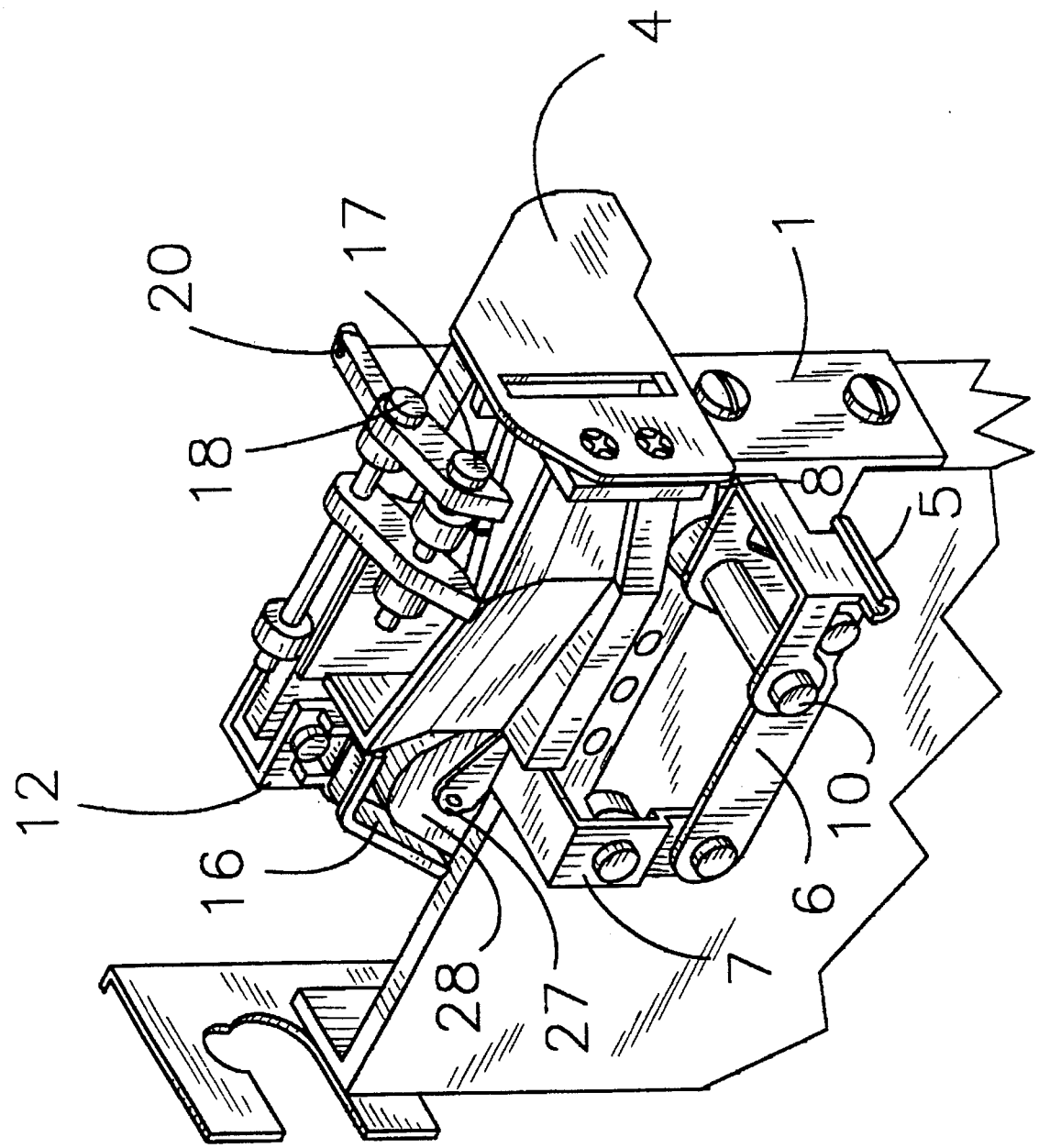

FIG. 3: Left side view showing top assembly of lead-in-chute, linkage, spring hook and axis.

Figure 4:
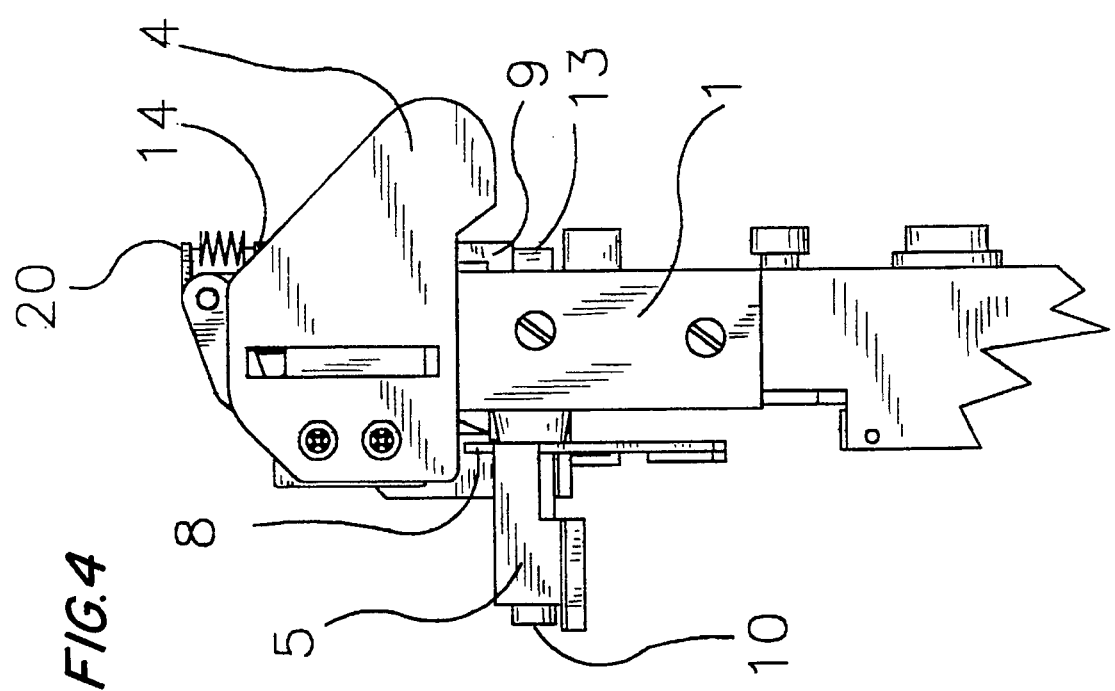

FIG. 4: Front view showing coin slot.

Figure 5:
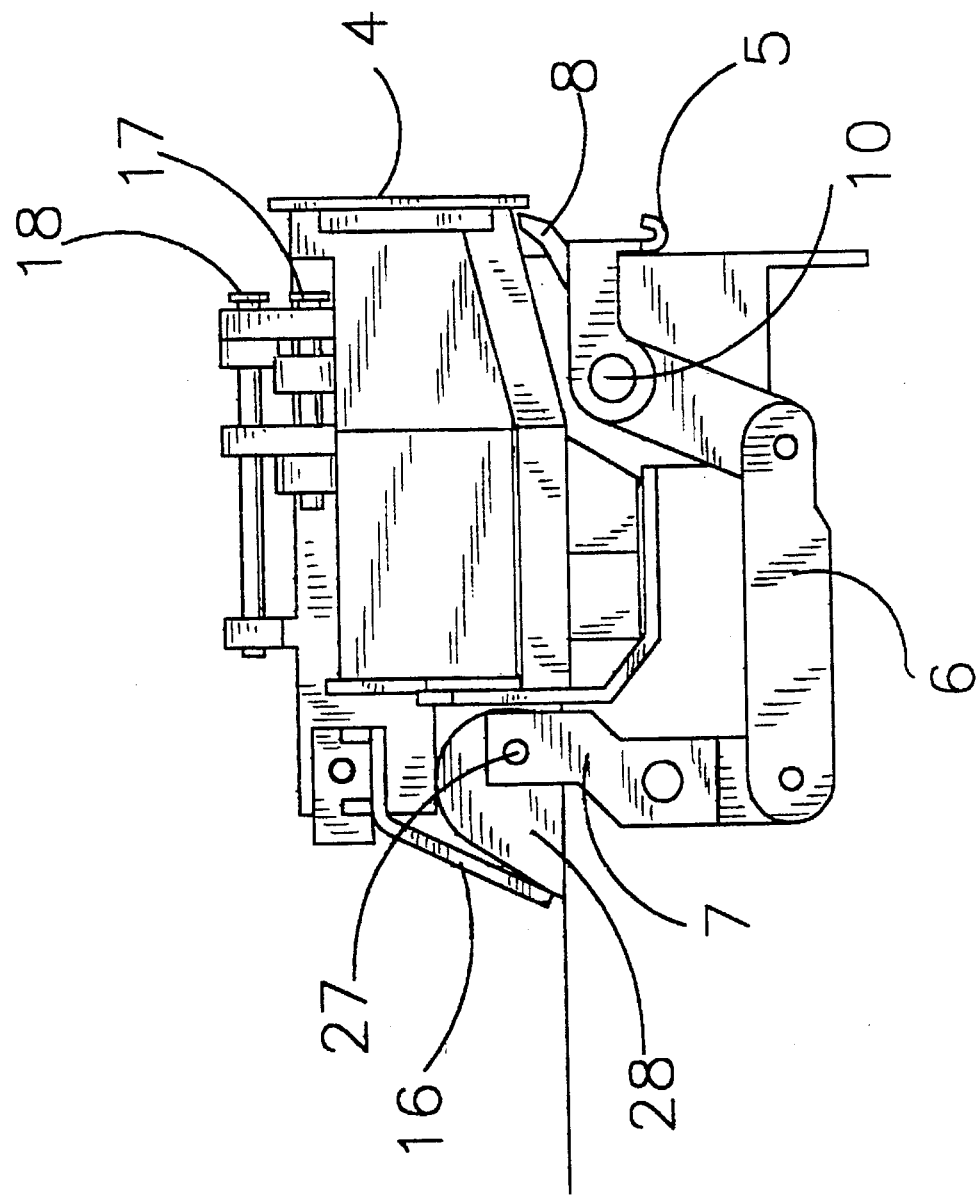

FIG. 5: Side view showing linkage and spring hook.

FIG. 6: Top view showing coin travelling direction inside lead-in-chute.

FIGS. 7A, 7B, 7C, 7D, 8A, 8B, 8C & 8D: Top view and inside view of lead-in-chute.

FIGS. 9A, 9B, 10A, & 10B: Front view showing different working positions of the moveable lead-in-chute plates, linkage, and arm.

Figure 11:
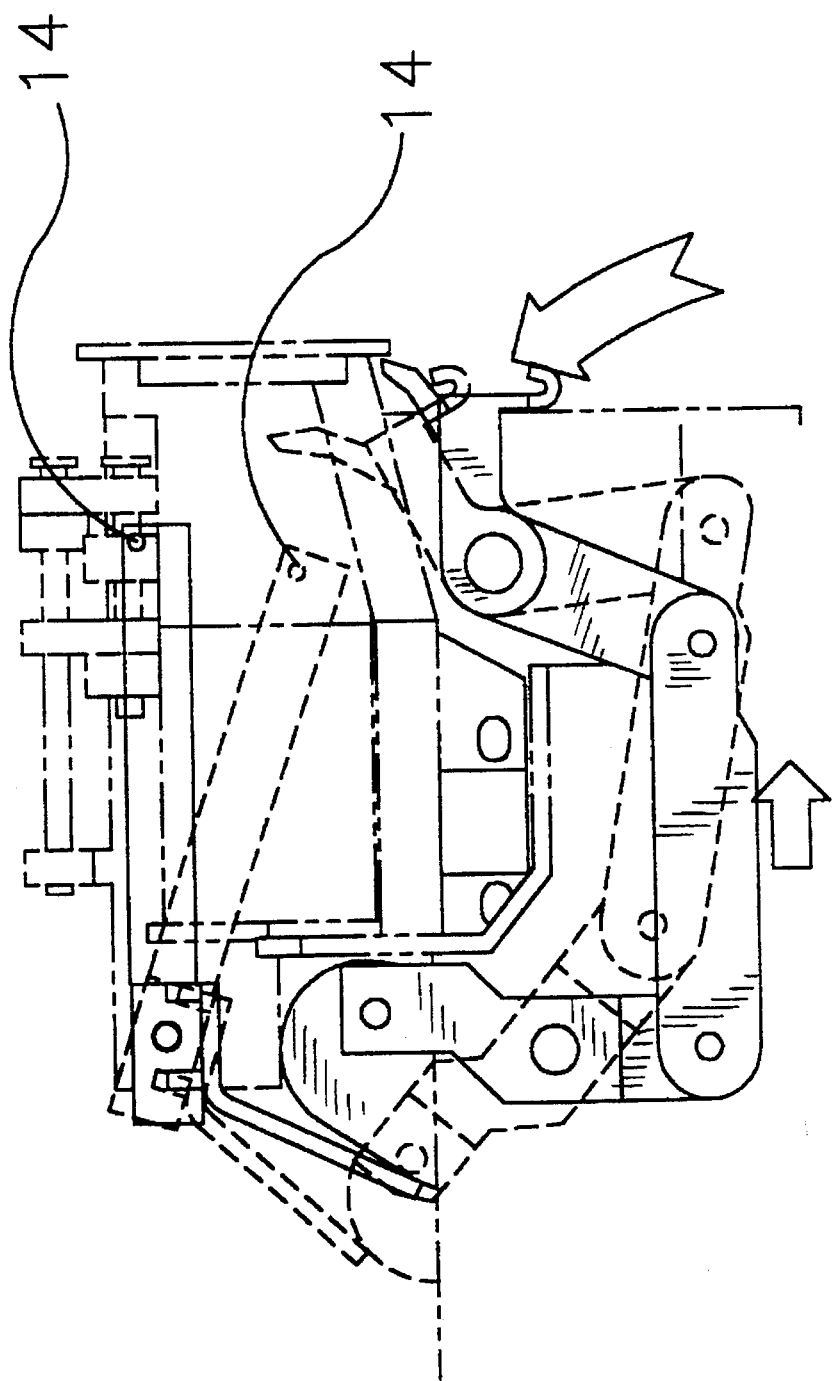
Figure 12:
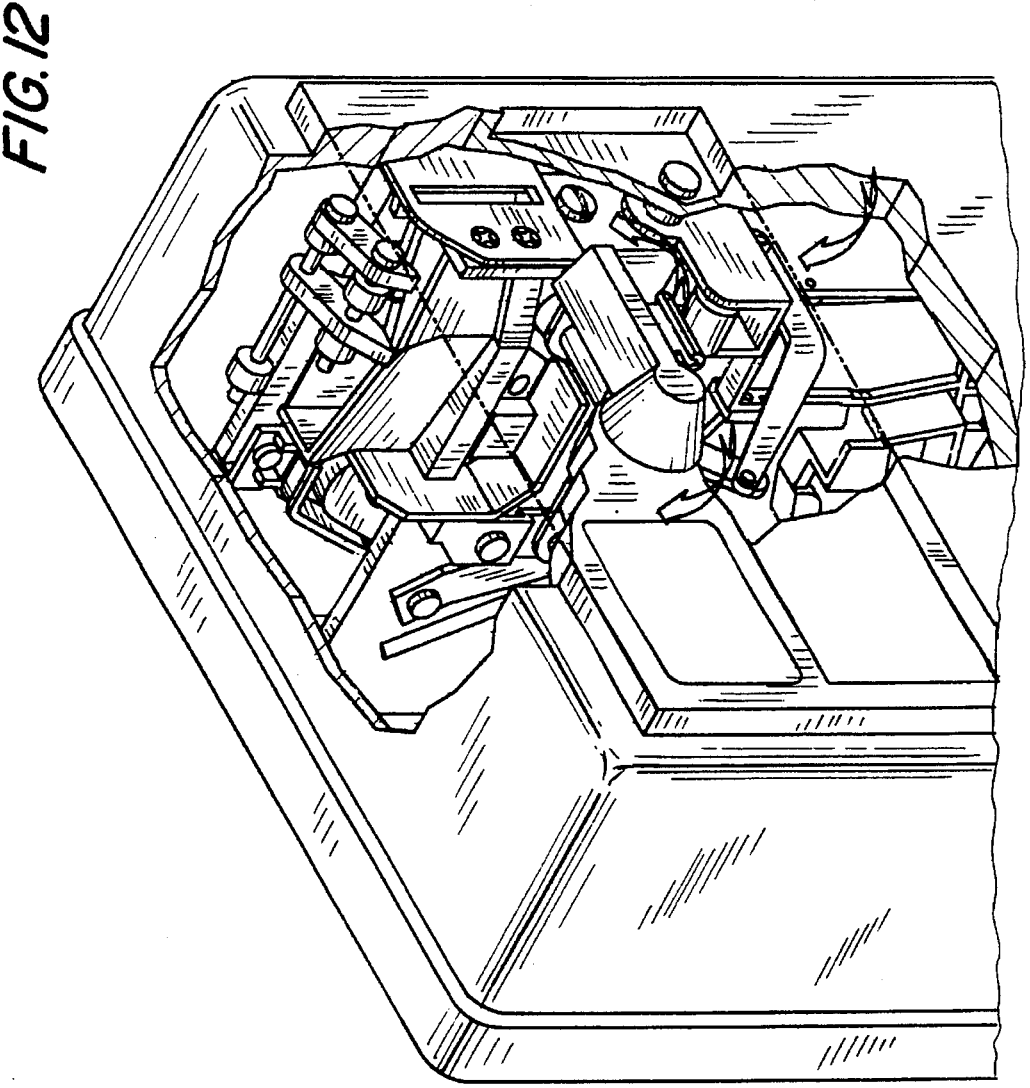
Figure 13B:
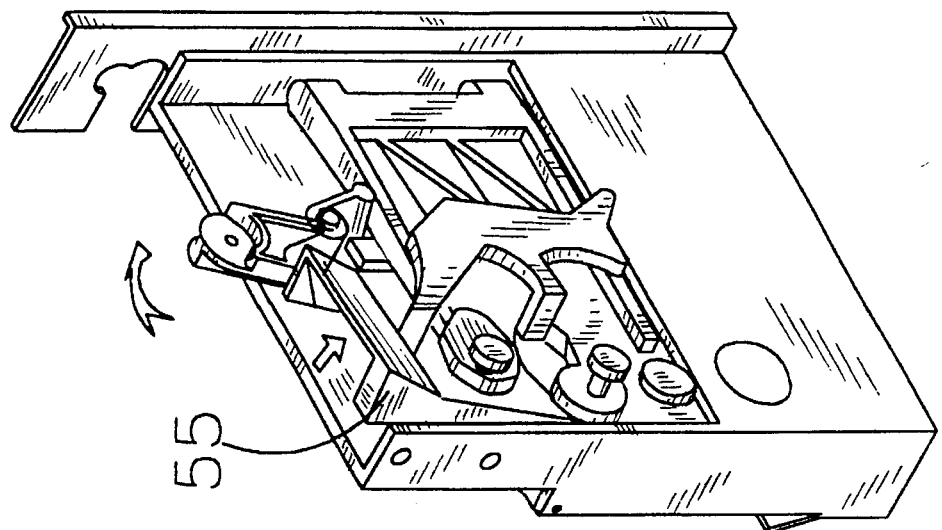
Figure 13A:
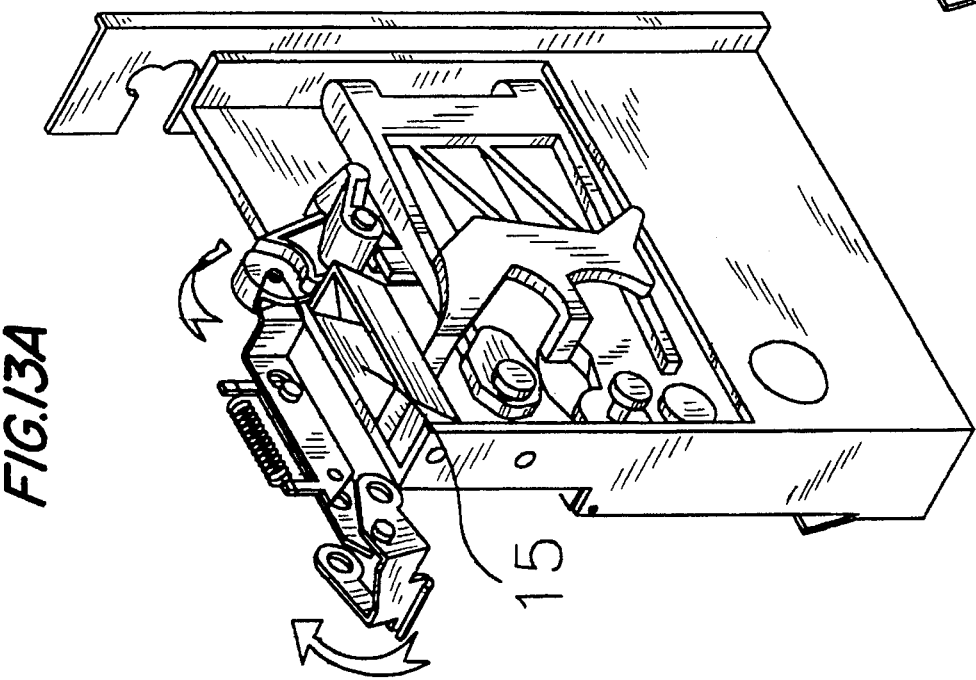

FIG. 11: Side view showing different working positions of linkage, lever and spring hook.

FIGS. 12 through 14C: Prior art.

DESCRIPTION:

A typical embodiment of the lead-in-chute, its connectors, linkage, rolling tongue, lever, arm, and spring hook of the present invention is illustrated in the drawings FIGS. 1, 2, 3 & 4.

Figure 7A:
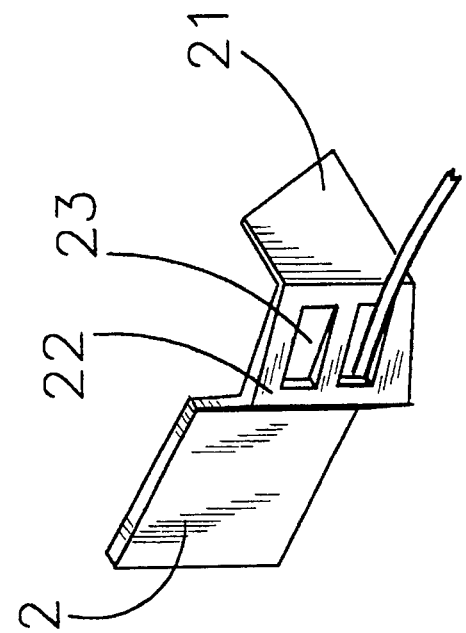
Figure 7D:
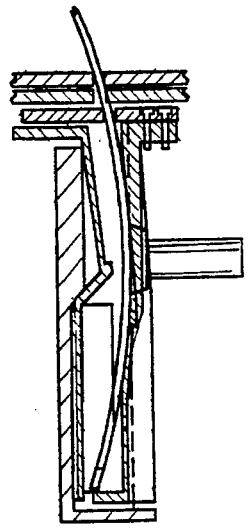
Figure 7B:
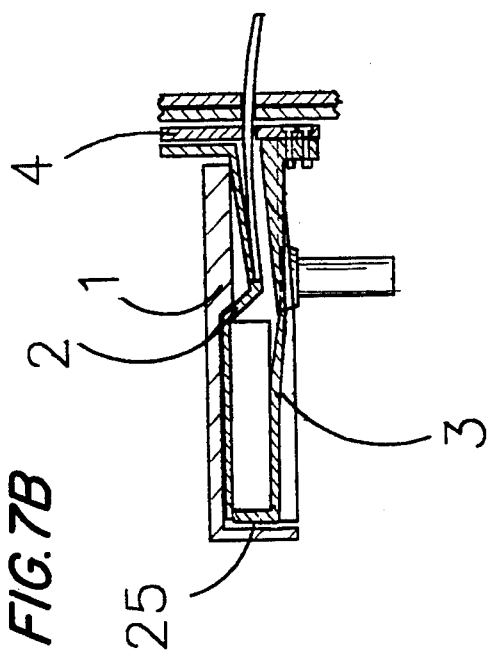
Figure 7C:
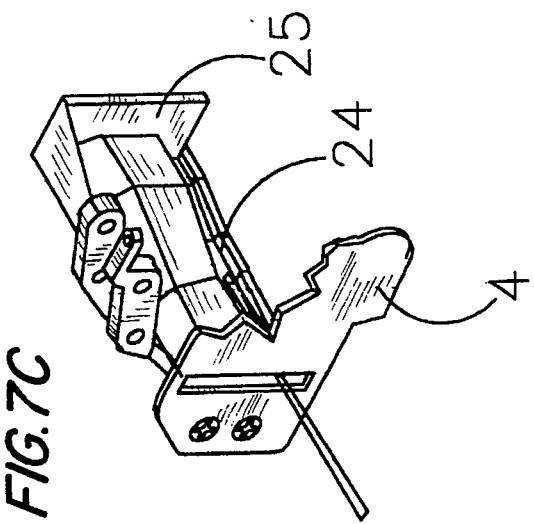
Figure 8A:
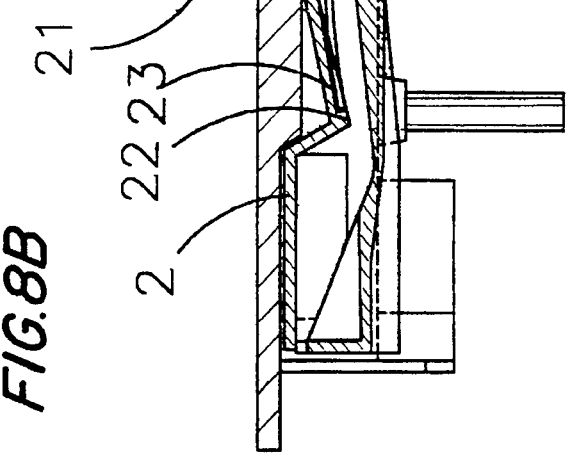
Figure 8B:
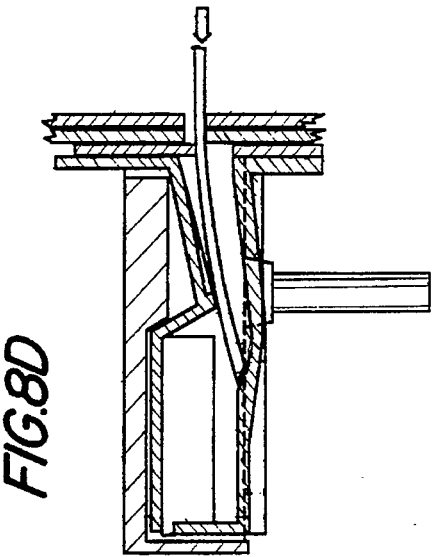
Figure 8C:
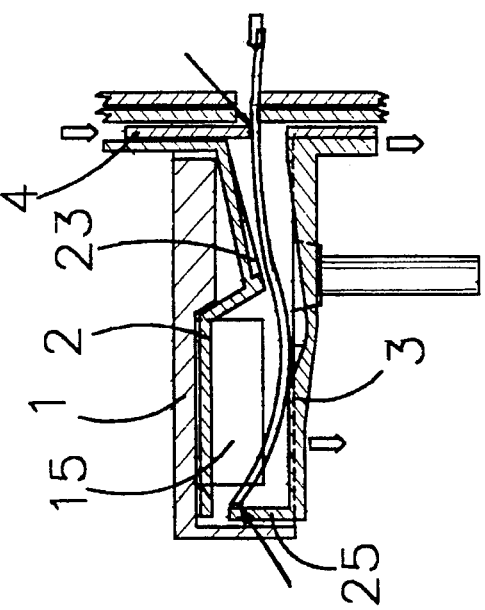
Figure 8D:
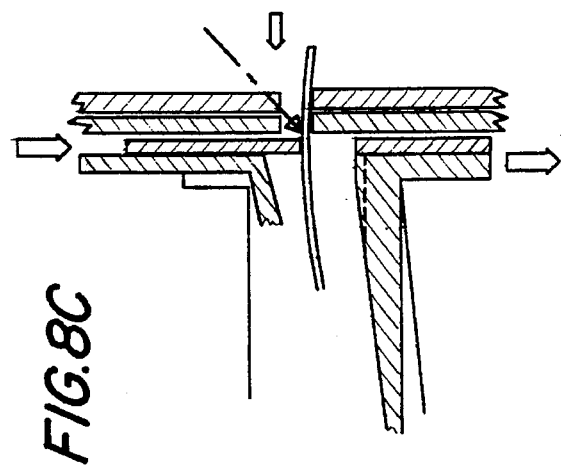

The lead-in-chute consists of three parallel rigid plates labelled 1, 2, and 3. (FIG. 1). On top of the coin acceptor is a modified non-moveable plate 1 having an opening 11 on it. A center plate 2 has a right angled closure 21. Adjacent to closure 21 is a side 22 on which there are two small rectangular indentations 23. (FIGS. 7A & 8A). The indentations are engraved at a gradual decent from the end near the coin slot to the protruding point of plate 2 (FIGS. 7B & 8B). These indentations have a width of no more than 7/16 inch with a depth of no more than 3/32 inch at the protruding point. The outside moveable plate 3 is embossed to form a substantial space at the top between center plate 2 and outside plate 3. Outside plate 3 has a right angled flat 4 on which there is a vertical coin slot. The opposite side of flat 4 is a small right angled extension 25. At the bottom rim of plate 3 is a notch 24 joining together with the bottom of extension 25 (FIGS. 1, 7B & 8B).

Figure 9B:
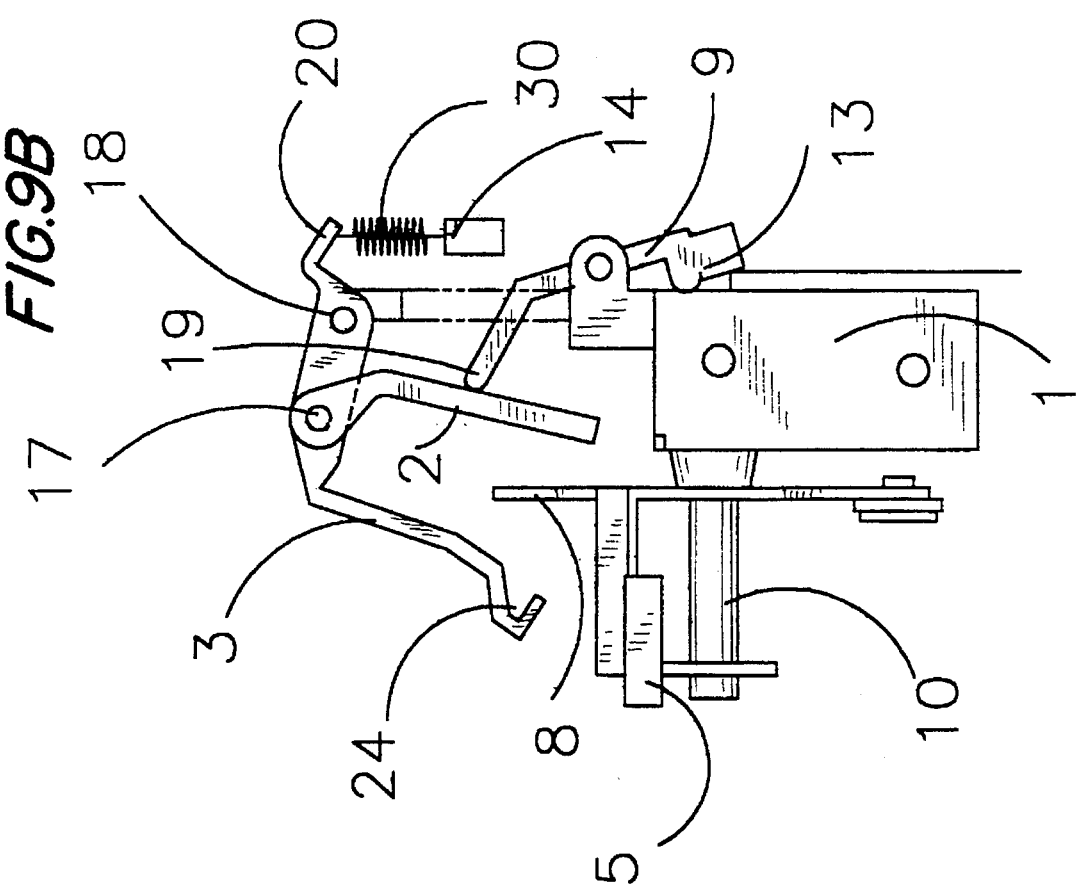
Figure 9A:
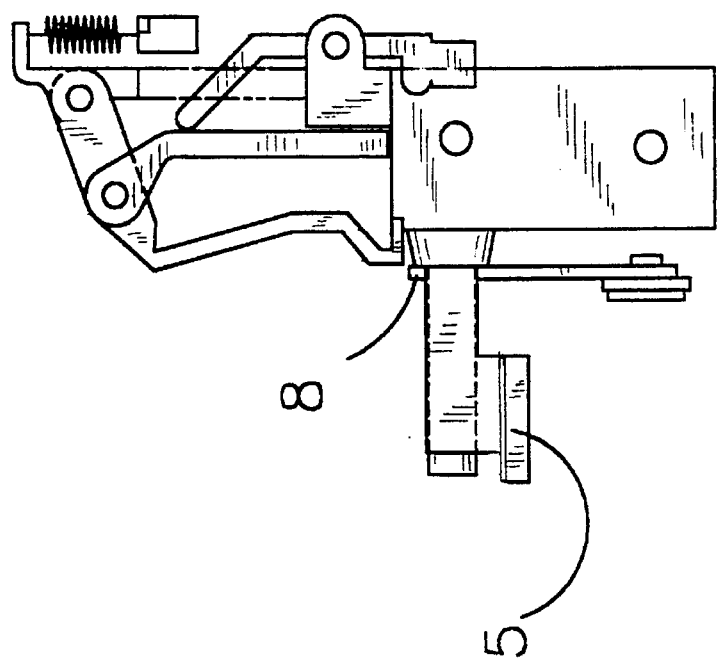

At the top of center plate 2 and top of plate 1, there are two singled-holed parallel connectors. At the top of outside plate 3, there is a pair of double-holed parallel connectors, (FIG. 1). Pin 18 connects plate 1 and outside plate 3 while pin 17 connects center plate 2 and outside plate 3 (FIGS. 1 and 2). When center plate 2 and outside plate 3 are connected together by pins 18 and 17, center plate 2 and outside plate 3 form a multi-angled lead-in-chute between them (FIGS. 6, 9A & 9B).

The lead-in-chute is connected from a gripping point 20 at its top to a lever 12 which is related to a rolling tongue 28 and a linkage 5, 6, 7. Lever 12, rolling tongue 28, and linkage 5, 6, 7 will interact with each other in response to the manual operation of the coin return release. Linkage 5, 6, 7 has one end mounted to an axis. A point 10 attaches from its bottom to a linkage from coin return release. On the axis, there is a spring hook 8 which may turn up and around the axis when point 10 is activated. The other end of linkage 5, 6, 7 is a joint 27 that connects with rolling tongue 28 by a clamp (FIGS. 1 and 3). Rolling tongue 28 attaches against a rigid sheet 16 of lever 12 (FIGS. 1 and 2). Lever 12 is pivotally connected to plate 1 at its waist. The other end of lever 12 is a draw bar 14 connected to gripping point 20 on outside plate 3 by a spring 30 (FIGS. 1 & 2). On the right hand side of plate 1 is an arm 9 (FIGS. 1 and 2). FIG. 2 shows arm 9 sitting between two small panels while a base 13 stays in contact with the conventional pop-out plate of the coin mechanism and a tip 19 reaches in through opening 11 on plate 1 (FIGS. 1, 2, 9A & 9B).

From the above description, a number of advantages of my anti-stuffing lead-in-chute device become evident:

(a) Two moveable plates will form a multi-angled lead-in-chute between them, making it impossible to stuff into the coin mechanism entrance any tissue, cloth or similar material. Stuffing will get caught between the coin slot and the coin mechanism entrance.

(b) The protruding point on the center plate blocks a wire or similar instrument away from reaching the coin mechanism entrance.

(c) When coin return release is activated, the linkage, the rolling tongue, and the lever will interact with the gripping point on top of the lead-in-chute. The outside plate will open up from its bottom to release any stuffed tissue, cloth or similar material.

(d) In response to manual operation of the coin return release, the spring hook will go up and around the axis within the space between the center plate and the outside plate to bring down any stuffing caught near the coin slot.

(e) With two rectangular indentations on a bevel angled side of the center plate, a wire or similar instrument will be stopped from penetrating further.

(f) The notch on the bottom rim of the moveable outside plate will catch a wire or similar instrument from further penetrating and damaging the circuit board behind the lead-in-chute.

(g) The use of an arm will enable the center plate kicking out stuffing while ensuring the closure moves to the position where it will block the coin slot when the coin mechanism is jammed by a bent coin or coin overflow.

OPERATION

Plates 1, 2, and 3 are assembled through their respective connectors by pins 18 and 17. A finished assembly of these plates will form a multi-angled lead-in-chute between center plate 2 and outside plate 3. The embossed outside plate 3 form a substantial space at top portion of lead-in-chute (FIGS. 9A & 9B). When coin is deposited into the coin slot, it will travel in the following way: it passes straight from the slot through the upper housing and face plate of the payphone and flat 4, hits the wall of plate 2, rolls to the left and hits the wall of plate 3, goes to the right, reaches coin mechanism entrance and drops into the coin mechanism from entrance 15 (FIG. 6).

When tissue, cloth or similar material is stuffed into the channel, it will have to travel in the same direction as a coin does as described above in order for it to reach the coin mechanism entrance 15. Since tissue, cloth or similar material must be pushed in by a wire or similar instrument, the wire or similar instrument will not be able to make turns inside the lead-in-chute as a coin will do when rolling in. Therefore, tissue, cloth or similar material will stay inside the lead-in-chute, between center plate 2 and outside plate 3 and will never reach coin mechanism entrance.

When one uses wire or similar instrument to push the stuffed tissue, cloth or similar material, the wire or similar instrument will first reach center plate 2. Indentations 23 will stop the wire or similar instrument from penetrating further.

In case the wire or similar instrument misses indentations 23, it will hit plate 3 and reach notch 24 at the bottom rim of plate 3 and extension 25 (FIGS. 7D, 8A, 8B, 8C & 8D). If wire or similar instrument pushes plate 3 or notch 24, it will force flat 4 moves out to the left and, thus, the wire or similar instrument will get pinched in between flat 4 and the up housing coin slot entrance (FIGS. 7A, 7B, 7C, 7D, 8A, 8B, 8C & 8D).

Therefore, the multi-angled lead-in-chute prevents a wire or similar instrument from reaching the coin mechanism entrance. As a result, tissue, cloth or similar material will not block the coin mechanism entrance 15. Instead, tissue, cloth or similar material will stay in the lead-in-chute, between center plate 2 and outside plate 3.

When wire or similar instrument leaves but tissue, cloth or similar material stays inside the lead-in-chute between center plate 2 and outside plate 3, flat 4 will move to the left due to the expending force caused by the stuffing between center plate 2 and outside plate 3. As flat 4 moves to the left, the coin slot will be blocked by flat 4.

Figure 10B:
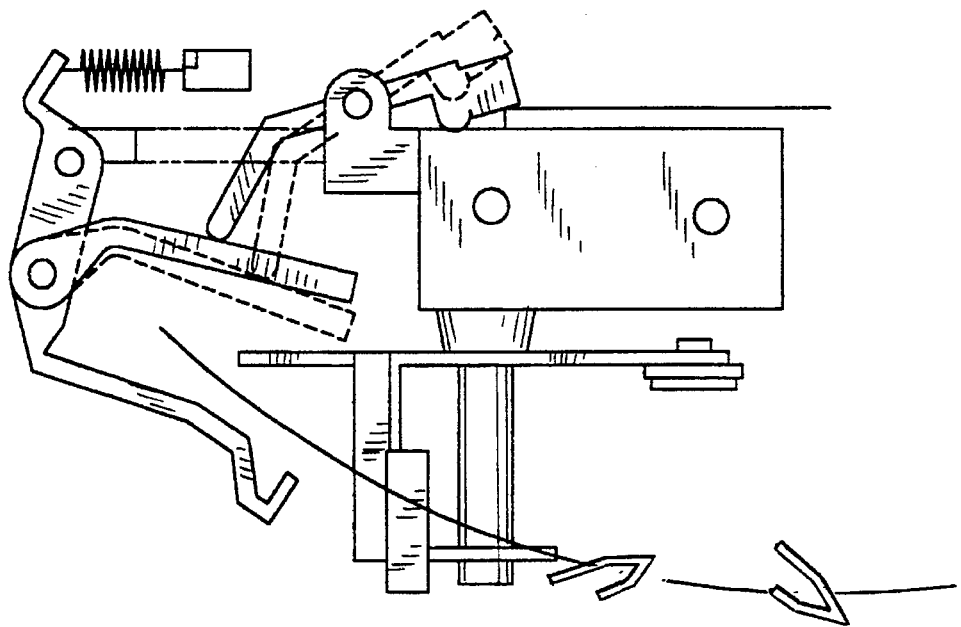

At this point, one may operate the coin return release. When this is being done, the coin return release will bring along linkage 5, 6, 7 by pushing up from point 10 (FIGS. 1 & 11). As point 10 goes up and around the axis, spring hook 8 turns up and around the axis as well, reaching the stuffing caught near the coin slot between center plate 2 and outside plate 3. Point 10 also carries joint 27 into action by bringing along rolling tongue 28 (FIGS. 3, 9A, 9B & 11). Rolling tongue 28 will push sheet 16 upper backwards while draw bar 14 goes down pulling gripping point 20 downward at the same time and, therefore, drawing outside plate 3 opening to the left from its bottom (FIGS. 9A, 9B & 10B). At opening position of embossed outside plate 3, the space between plate 3 and plate 2 has a substantially equal width at top and at bottom so that tissue, cloth or similar material will never get caught in a top narrow space between plate 3 and plate 2.

Figure 10A:
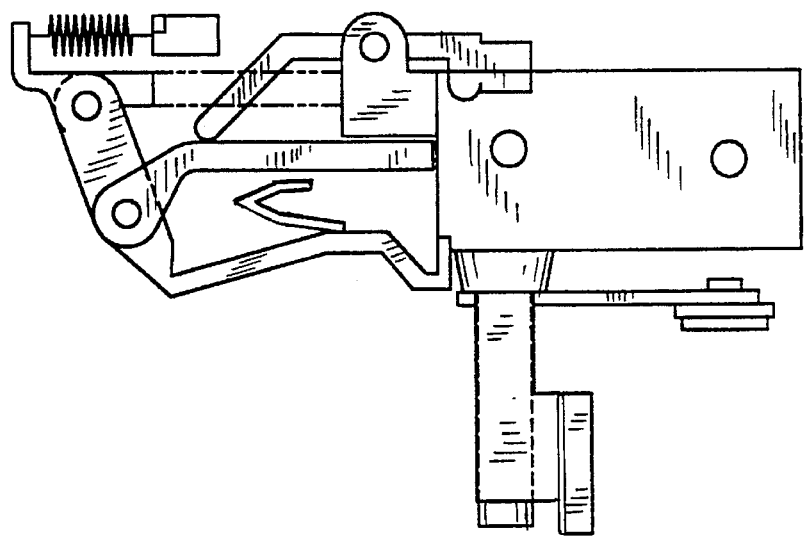

Meanwhile, the conventional plate of the coin mechanism pops out forcing base 13 to kick out while arm 9 stays at its pop-out position (FIGS. 9A, 9B, 10A & 10B). Center plate 2 moves to the left kicking out stuffing away from the lead-in-chute (FIGS. 10A & 10B). As mentioned earlier, while the linkage, the lever, and the rolling tongue are interacting with each other and center plate 2 is kicking out stuffing, spring hook 8 goes up and around the axis and brings down stuffing caught near the coin slot. (FIGS. 9B & 11). As soon as coin return release settles at its original position, the interacting lever, rolling tongue, and linkage will bring the lead-in-chute assembly back to its normal working position as well.

When a bent coin is deposited or when there is an overflow of coins jamming the coin mechanism, the conventional pop-out plate will not return to its original position. Thus, arm 9 will remain in reaching in position, making coin slot stay blocked by closure 21 and flat 4.

I claim:

1. An anti-stuffing lead-in-chute device for use with a coin acceptor box comprising;
    a rigid non-movable plate having an opening on the top of the coin acceptor box;
    a rigid movable center plate that is bent in a zigzagged manner and parallel to said rigid non-movable plate;
    a rigid movable outside plate that is bent in a zigzagged manner and parallel to said center plate and has a right angled flat with a vertical coin slot;
    a first fastening means on the top edge of the outside plate for pivotally fastening the outside plate to the non-movable plate;
    a second fastening means on the top edge of the center plate for pivotally fastening the center plate to the outside plate;
    a lever connected to the rigid non-movable plate on a side opposite to the center plate by a pin on a first end of the lever such that the lever is rotatable about the pin;
    a spring with one end connected to said first fastening means and the other end connected to a second end of the lever;
    a connecting means for rotating the lever about said pin for facilitating movement of the center plate and the outside plate against the non-movable plate.

2. An anti-stuffing lead-in-chute device of claim 1, wherein said first fastening means comprises two connectors protruding from the top edge of the outside plate, each connector having a first hole in the middle and a second hole in the end respectively, and the second fastening means comprises a third connector protruding from the top edge of the center plate and having a third hole, wherein a pivotal pin is fixed on the top edge of the non-movable plate and inserted through the first holes and a second pivotal pin inserted through the second holes and the third hole.

3. An anti-stuffing lead-in-chute device of claims 1, wherein said spring, in response to manual operation of a coin return release and interaction of said connecting means, lifts the outside plate off the non-movable plate, thereby facilitating clearing of any foreign objects caught within the space between said center plate and the outside plate.

4. An anti-stuffing lead-in-chute device of claims 1, wherein said connecting means comprises a rolling tongue connected to a linkage which is contacted with a conventional coin return release, whereby manual operation of said coin return release will activate said linkage which in turn actuates said rolling tongue which finally engages said lever.

5. An anti-stuffing lead-in-chute device of claim 4, wherein said lever has a draw bar connected to a gripping point extended from one of said first fastening means, whereby said draw bar in response to movement of said connecting means pulls down said gripping point making said moveable outside plate to open from its bottom thereby releasing any foreign objects from said lead-in-chute.

6. An anti-stuffing lead-in-chute device of claim 4, wherein said lever, in response to manual operation of said coin return release, may rotate up and around said axis on one end while the other end is pushing up and backward against said rolling tongue.

7. An anti-stuffing lead-in-chute device of claim 1, wherein said non-moveable plate, said moveable center plate and said moveable outside plate are assembled in a vertical parallel position at said pivotal pins on top of said three plates, whereby, in response to a drawing force coming from interaction among said gripping point, said draw bar, said lever, said rolling tongue, said linkage, and said coin return release, said moveable outside plate will move wide open from its bottom while said moveable center plate remains in its vertical position, whereby releasing any foreign objects caught in between said outside plate and said center plate.

8. An anti-stuffing lead-in-chute device for use with a coin acceptor box of a pay phone comprising;
    a rigid non-movable plate having an opening;
    a rigid movable center plate that is bent in a zigzagged manner and parallel to said rigid non-movable plate;
    a rigid movable outside plate that is bent in a zigzagged manner and parallel to said center plate and has a right angled flat with a vertical coin slot;
    a lever connected to the rigid non-movable plate on a side opposite to the center plate by a pin on a first end of the lever such that the lever is rotatable about the pin;
    a connecting means for facilitating relative movements of the three plates in concert with the lever in response to manual operation of a coin return release;
    a fastening means for joining said center plate and said outside plate with said non-movable plate at a spaced distance between said center plate and said outside plate so as for the spaced distance to form a zigzagged lead-in-chute, wherein said fastening means comprises two connectors on the top edge of the non-movable plate, each having a first hole, a connector on the top edge of the center plate having a second hole and two connectors on the top of the outside plate, each having a third hole and a fourth hole and further comprises one pivotal pin inserted through the first holes and the third holes and another pivotal pin inserted through the second hole and the fourth holes.

9. An anti-stuffing lead-in-chute device of claim 8, wherein, when the lead-in-chute is jammed due to coin overflow or foreign objects, a pivoted arm in response to the pop-out plate of the coin acceptor box staying in its pop-out position rotates into said opening in the non-movable plate for making said coin slot on the flat out of alignment with the coin slot of a pay phone upper housing, thereby preventing additional coins or foreign objects from being deposited into said lead-in-chute.

10. An anti-stuffing lead-in-chute device of claim 8, wherein said connecting means further comprise a linkage having a a rolling tongue which engages said lever in response to movement from said linkage that actuates said rolling tongue in response to manual operation of said coin return release.

* * * * *